(12) United States Patent
Allen

(10) Patent No.: US 6,575,239 B2
(45) Date of Patent: Jun. 10, 2003

(54) WELL CLEANING TOOL

(75) Inventor: Anthony Allen, Aberdeen (GB)

(73) Assignee: Ruff Pup Limited (GB)

( * ) Notice: Subject to any disclaimer, the term of this patent is extended or adjusted under 35 U.S.C. 154(b) by 0 days.

(21) Appl. No.: 09/904,405

(22) Filed: Jul. 12, 2001

(65) Prior Publication Data

US 2002/0005284 A1 Jan. 17, 2002

(30) Foreign Application Priority Data

Jul. 15, 2000 (GB) ................................................ 0017329

(51) Int. Cl.[7] .............................. B08B 9/00; F16L 45/00; E21B 37/00
(52) U.S. Cl. ................... 166/170; 15/104.2; 15/104.09; 15/104.16; 166/173
(58) Field of Search .............................. 166/170, 173, 166/171, 311, 312; D4/128; 15/104.16, 104.09, 104.2

(56) References Cited

U.S. PATENT DOCUMENTS

| | | | | |
|---|---|---|---|---|
| 5,002,139 A | * | 3/1991 | Haussmann et al. | 166/173 |
| 5,419,397 A | * | 5/1995 | Reynolds et al. | 166/312 |
| 5,570,742 A | | 11/1996 | Reynolds et al. | |
| 5,819,353 A | * | 10/1998 | Arnell et al. | 15/104.16 |
| D436,237 S | * | 1/2001 | Moslet et al. | D32/14 |
| 6,279,962 B1 | * | 8/2001 | McGarain et al. | 285/12 |

FOREIGN PATENT DOCUMENTS

| | | |
|---|---|---|
| GB | 2 299 599 A | 10/1996 |
| GB | 2 340 862 A | 3/2000 |

* cited by examiner

Primary Examiner—David Bagnell
Assistant Examiner—Kenneth Thompson
(74) Attorney, Agent, or Firm—Fay, Sharpe, Fagan, Minnich & McKee, LLP

(57) ABSTRACT

A well cleaning tool adapted for connection to a drill string for removing debris and residues from the inner wall of a well casing, comprises an elongate generally cylindrical member (1) having a plurality of scratching elements (2) in the outer surface thereof. First and second helical channels or grooves (3 and 4) are defined in the outer surface of the cylindrical member (1) between the scratching elements (2), the second helical channel or groove (4) running in the counter direction to the first helical channel or groove (3).

19 Claims, 3 Drawing Sheets

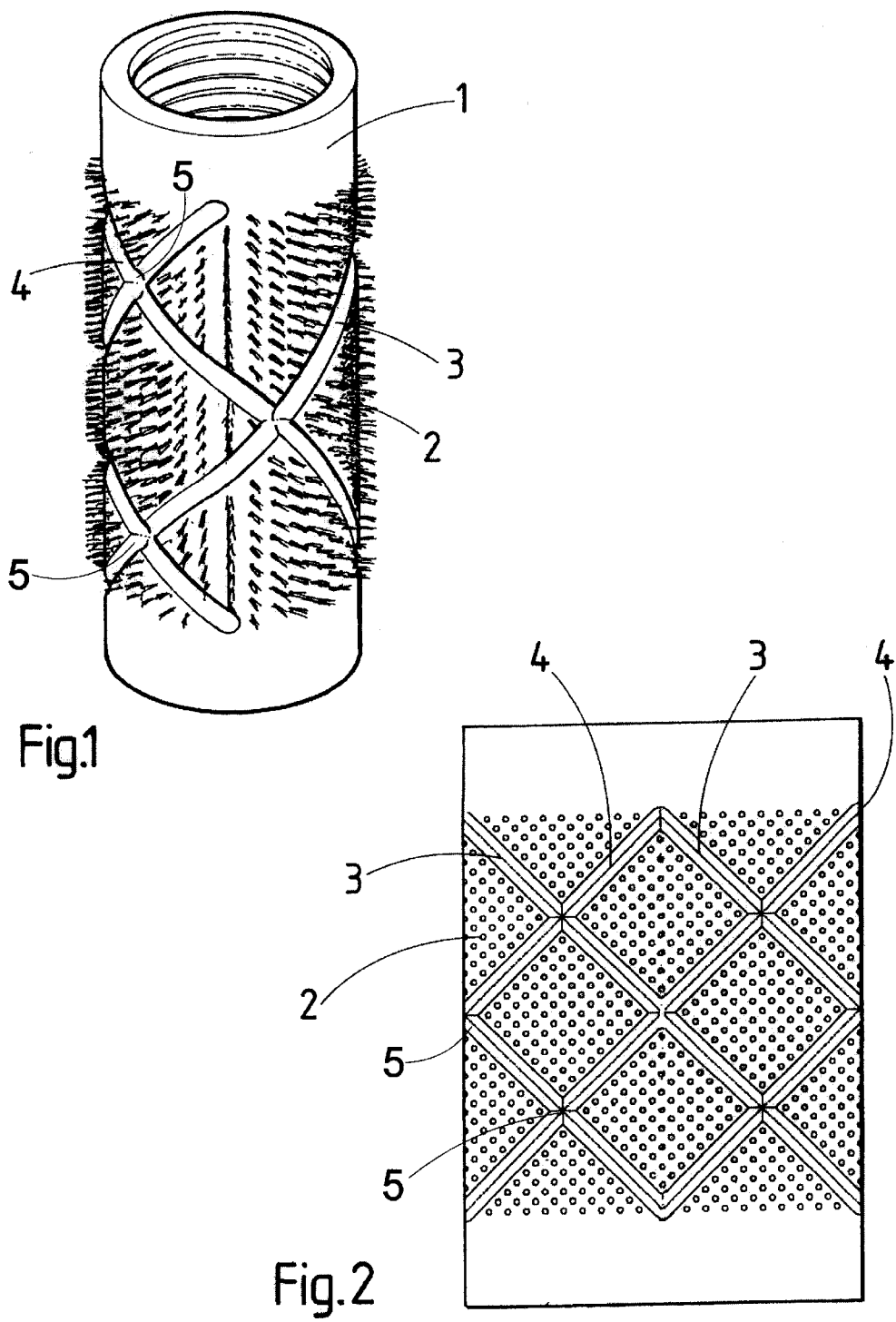

WELL CLEANING TOOL

The present invention relates to a well cleaning tool for removing debris accumulated in a well casing and more specifically to such a tool having a plurality of bristles or scratching elements for removing the debris. The well cleaning tool may be used alone, but may also be used in combination with solvents and/or cleaning fluids which assist removal of the debris. Such debris typically comprises drilling fluid, cement compositions, pipe joint compositions and other materials.

Oil, gas, water and other types of wells almost always employ a steel pipe or well casing to ensure the integrity of the well borehole. The well casing is cemented during the completion stage of a drilling operation. This cementing operation inevitably leaves cement residue on the well casing wall which must be removed before initiating well production. Cleaning of the well casing is also necessary at intervals during well production to remove debris and residues, such as oil paraffin and scale which have accumulated on the well casing wall.

Well casing scrapers are well known in the art. One such known scraper comprises an elongate body or "plug" to which are attached metal blades. The blades scrape the casing wall as an hydraulic or mechanical force displaces the body through the casing. A disadvantage of such scrapers propelled by hydraulic force is that the scraper and the debris it removes from the well casing wall are not retrievable. Instead, the scraper and the debris are pushed through the well bore casing past the point of interest, where they remain to clutter the well borehole.

Another scraper known in the prior art is connected to a work string which mechanically drives the scraper through the well bore casing to effect a cleaning action. Once the cleaning operation is completed the scraper is removed from the well bore casing with the drill string. In GB-A-2295632 the scraper comprises an elongated, generally cylindrical member and a helical swath of scratching elements or bristles affixed to the side walls of the cylindrical member. The side walls of the cylindrical member are resiliently compressible to allow insertion of the tool into the casing and to exert a radially outward pressure on the scratching elements against the inner wall of the well casing. The side walls of the cylindrical member also define a helical channel adjacent to the swath of scratching elements such as to allow cleaning flowing to the scraper to circulate freely between the cylindrical member and the inner wall of the well casing. The cleaning fluid serves to carry away loosened debris scoured from the wall of the well casing.

The resiliently compressible side walls of the cylindrical member in which the scraper elements are mounted is comprised of a foam like material covered with a heavy fabric covering. The foam like material provides the required resiliency, whilst the fabric covering supports the scraper elements. Securing the foam and fabric covering to the cylindrical member can present problems. Moreover, the design of this scraper tool means that it is not robust enough for rough oilfield usage; it is particularly susceptible to loosing bristles.

Furthermore, because only one helical path is provided for the passage of well bore fluids around the scraper tool, the scraper tool can be subject to a so-called "plunger" effect as it is pushed into and pulled out of the well bore casing; that is to say pressure may build up in front of the scraper tool.

It is an object of the present invention to provide a well cleaning tool which is robust enough for oilfield usage.

It is another object of the present invention to provide a well cleaning tool in which the scratching elements or bristles can be replaced as they become worn, thus allowing repeated usage of the scraper tool.

It is a further object of the present invention to provide a well cleaning tool which allows for the free circulation of well bore fluids between it and the well bore casing and which is, therefore, subject to little or no plunger effect.

According to the present invention there is provided a well cleaning tool adapted for connection to a drill string for removing debris and residues from the inner wall of a well casing, the tool comprising an elongate generally cylindrical member having a plurality of scratching elements in the outer surface of the said member, wherein first and second helical channels or grooves are defined in the outer surface of the said member between the said scratching elements, the second helical channel or groove running in the counter direction to the first helical channel or groove.

Preferably, the scratching elements are spring steel bristles. The spring steel bristles are secured in holes in the outer surface of the cylindrical member and can be replaced as they become worn.

Preferably, the well cleaning tool comprises a generally cylindrical rigid sleeve which is releasably mounted on a mandrel adapted for connection to a drill string. The cylindrical rigid sleeve defines the said outer surface in which the scratching elements are mounted, including the first and second helical channels or grooves. Conveniently, the mandrel is threaded on both ends for connection to a drill string and has an annular bore for allowing fluid to be circulated through it.

Preferably, the cylindrical rigid sleeve is comprised of aluminium alloy.

In one embodiment of the present invention the cylindrical rigid sleeve is secured against rotation on and against longitudinal movement along the said mandrel. Conveniently, this is achieved by providing a two-part mandrel, the first part defining a pin or spindle which extends through the said cylindrical rigid sleeve and having an externally threaded section at the inner end thereof onto which an internally threaded section in one end of the cylindrical rigid sleeve is screwed, and the second part defining a locking collar which is attached to the pin or spindle at the outer end thereof to lock against the other end of the cylindrical rigid sleeve. Conveniently, the outer end of the pin or spindle defines an externally threaded section which engages with an internally threaded section in the end of the second part of the mandrel.

In a second embodiment of the present invention the cylindrical rigid sleeve is selectively rotatable on the said mandrel with the drill string, Conveniently, this is achieved by providing a dog clutch between adjacent ends of the sleeve and the mandrel which, in use, are located at the forward end of the well cleaning tool, and by allowing longitudinal movement of the sleeve relative to the mandrel to cause the dog teeth of the dog clutch to selectively engage with each other. The facility to selectively engage the cylindrical rigid sleeve with the mandrel carrying it in the drill string is particularly useful when the well cleaning tool is employed above a drill bit which is drilling out a cement plug or cement retainer bridge plug. If the sleeve is allowed to always rotate with the drill string it would soon wear out and cease to scour the inner walls of a well casing effectively. However, because the dog clutch between the sleeve and the mandrel is disengaged as the well cleaning tool travels down into the well bore (the sleeve is pushed back towards the rearward end of the mandrel) any rotation of the drill string to effect a drilling action is not translated into rotational movement of the sleeve. In contrast, once the drilling action has been completed and the well cleaning tool has been pushed down to the drilled region, the drill string can be pulled back, causing the sleeve to slide to the forward end of the mandrel and thereby engaging the dog clutch. With the dog clutch engaged the well bore casing can be cleaned and scoured as the well cleaning tool is withdrawn by both rotational and longitudinal movement of the sleeve.

Embodiments of the present invention will now be described, by way of example, with reference to the accompanying drawings, in which:

FIG. 1 is a vertical view of the sleeve of a scraper tool embodying the present invention;

FIG. 2 shows the arrangement of bristles and channels in the outer surface of the sleeve shown in FIG. 1;

Figure 3:
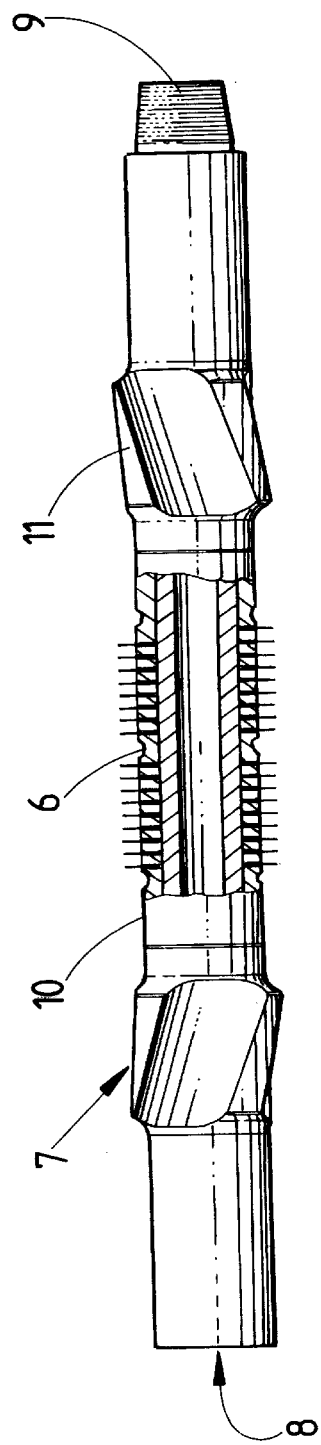
FIG. 3 is a partial sectional side view of the sleeve shown in FIG. 1 mounted on a mandrel for connection into a drill string.

Referring to FIGS. 1 and 2 of the drawings there is shown a sleeve for use in a scraper tool embodying the present invention comprising an elongate tubular body 1 made of aluminium alloy. The body may be machined or cast from the alloy.

In the middle region of the outer surface of the body 1 there are provided a plurality of holes into each of which are inserted spring steel bristles 2. The outer diameter of the sleeve is such that when in use in a well bore casing the spring steel bristles 2 engage with and exert a radially outward pressure against the inner wall of the casing. This, of course, effects a cleaning action on the inner wall of the casing as the sleeve moves therethrough.

First and second helical grooves or channels 3 and 4 are provided in the outer surface of the body 1 between the bristles 2. The first channel 3 runs clockwise around the body, whilst the second channel runs counterclockwise. The channels 3 and 4 allow cleaning fluid to circulate freely around the sleeve as it travels through a well bore casing and by virtue of there being two such channels running in opposite directions to each other around the body 1 the so-called "plunger" effect which manifests itself as the cleaning tool is pushed or pulled through a body of fluid is minimised. By way of explanation the "plunger" effect resists movement of the well cleaning tool through the fluid. A further advantage of the counter rotating channels is that turbulence is created in the cleaning fluid circulating around sleeve at the crossover points 5 between the channels 3 and 4 which greatly assists the cleaning action of the cleaning fluid.

Figure 4:
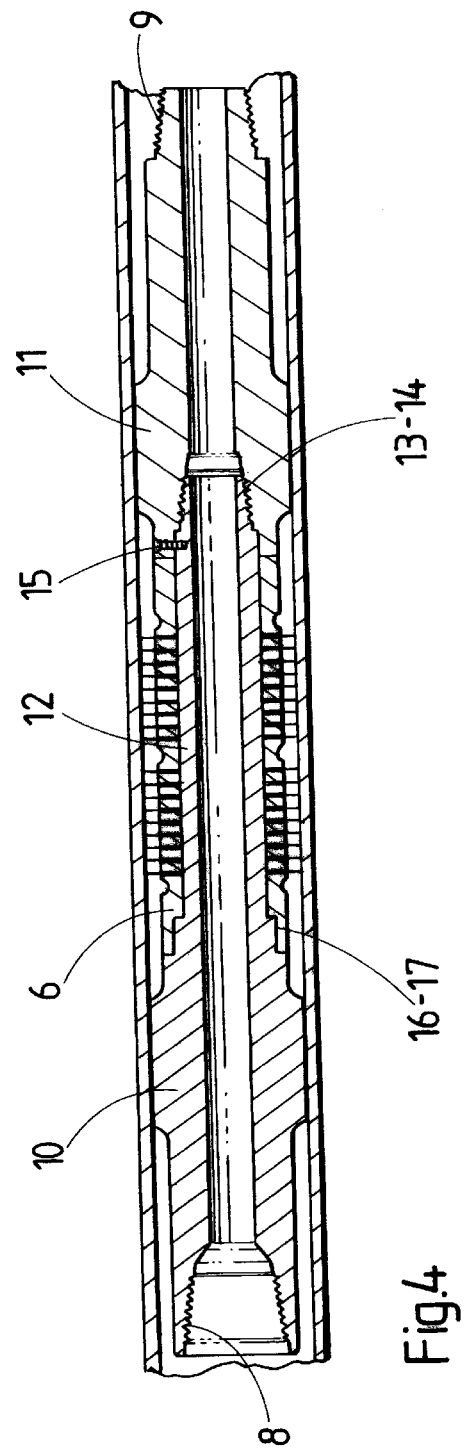
FIG. 4 is a full sectional side view of the sleeve and mandrel combination shown in FIG. 3 located within a well casing.

Referring now to FIGS. 3 and 4, the sleeve 6 shown in FIG. 1 is mounted for use on a mandrel 7 having an internally threaded section 8 at one end and an externally threaded section 9 at the other end to facilitate connection in a drill string. The mandrel is comprised of two parts 10 and 11, the first part 10 comprising a pin or spindle 12 which at its free end has an externally threaded section 13 which is engaged with an internally threaded section 14 in the second part 11 to connect the two parts together. To prevent the two parts from accidentally unscrewing from each other a locking screw 15 is provided which screws through a hole in the wall of the second part 11 into the spindle 12. At the innermost end of the spindle 12 is an externally threaded section 16 onto which can be screwed an internally threaded section 17 in the end of the sleeve 6. It will be understood that to assemble the well cleaning tool ready for use the two parts 10 and 11 of the mandrel 7 are unscrewed from each other and the sleeve 6 is slid onto the spindle 12. The screw-threaded section 17 in the end of the sleeve 6 is then screwed onto the screw-threaded section 16 on the inner end of the spindle 12. Finally, the second part 11 of the mandrel 7 is screwed back onto the first part 10 to clamp the sleeve there between and the locking screw is inserted to secure the two parts together.

It will be understood that the sleeve 6 is locked on the mandrel 7 and cannot therefore rotate relative thereto, nor move longitudinally relative thereto. Thus, in use, when the well cleaning tool is connected in a drill string and inserted into a well the sleeve will rotate with the drill string and move through the well bore with the drill string.

Figure 5:
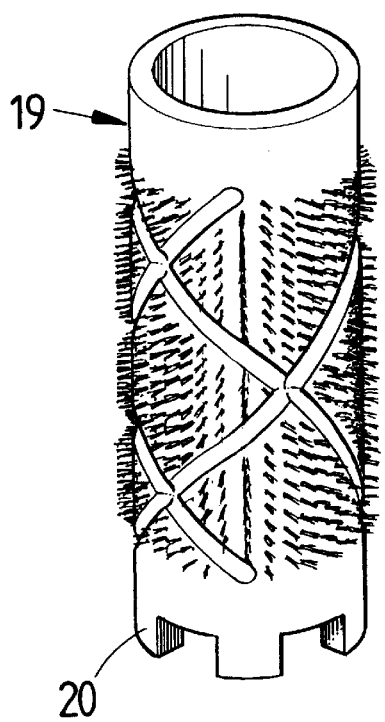
FIG. 5 is a vertical view of a further sleeve of a scraper tool embodying the present invention and having dog teeth at one end thereof.
Figure 6:
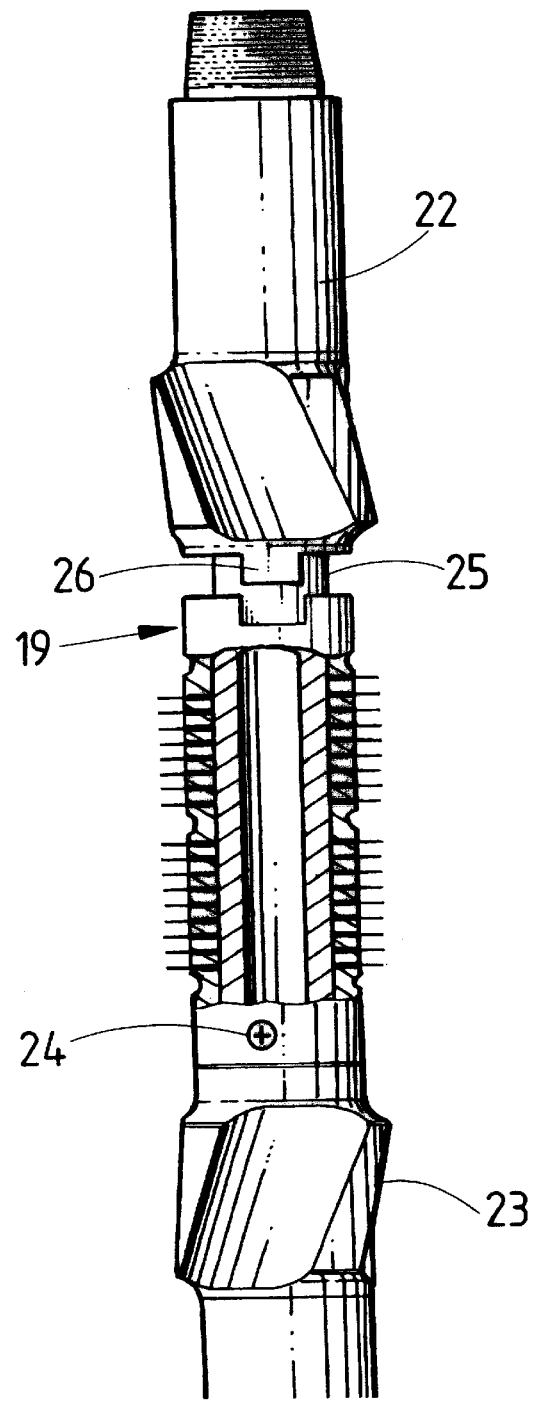
FIG. 6 is a side view of the sleeve shown in FIG. 5 mounted on a mandrel for connection into a drill string.

Referring now to FIGS. 5 and 6 there is shown a second embodiment of a well cleaning tool in accordance with the present invention. Turning firstly to FIG. 5 it will be seen that the sleeve 19 is in all respects identical to the sleeve 6 previously described, except that in its upper end there are provided a plurality of castellations or dog teeth 20 and there is no internally threaded section in either end of the sleeve. Turning now to FIG. 6 it will be seen that the sleeve 19 is again mounted on a mandrel comprising of two parts 22 and 23 which are screwed together and which are prevented from accidentally unscrewing by a locking pin 24. The first part 22 comprises a pin or spindle 25 onto which the sleeve 19 is mounted. However, in contrast to the spindle of the previously described embodiment the length of the spindle 25 is such that the sleeve 19 is free to slide a short distance back and forth along it. The sleeve 19 is also free to rotate on the spindle 25 under certain circumstances, as will be explained hereinbelow. An internally threaded section at one end of the mandrel and an externally threaded section at the other end of the mandrel allow the well cleaning tool to be connected into a drill string.

At the end of the spindle 25 immediately adjacent to the dog teeth 20 in the sleeve 19 (the forward end of the well cleaning tool in use), corresponding dog teeth 26 are formed in the main body of the second part 23 of the mandrel. The dog teeth 26 in the second part 23 of the mandrel are engageable with the dog teeth 20 in the sleeve 19 and together they form a dog clutch. It will be apparent that when the two sets of dog teeth 20 and 26 are engaged with each other the sleeve 19 is locked to the mandrel and is, therefore, forced to rotate with it. Alternatively when the two sets of dog teeth 20 and 26 are disengaged the sleeve 19 and the mandrel are free to rotate relative to each other.

The facility to selectively lock the sleeve 19 to the mandrel carrying it in a drill string is particularly useful when the well cleaning tool is employed above a drill bit which is drilling out a cement plug or cement retainer bridge plug. If the sleeve 19 is forced to always rotate with the drill string it would soon wear down the bristles in its outer surface and cease to exert an effective cleaning action on the inner walls of a well casing. However, because the dog clutch formed by the dog teeth 20 and 26 is effectively disengaged as the well cleaning tool travels down into the well bore (the sleeve 19 is pushed back towards the rearward end of the mandrel) any rotation of the drill string to effect a drilling action is not translated into rotational movement of the sleeve 19. In contrast, once the drilling action has been completed and the well cleaning tool has been pushed down to the drilled region, the drill string can be withdrawn, causing the sleeve 19 to slide to the forward end of the mandrel and thereby engaging the dog clutch defined by dog teeth 20 and 26. With the dog clutch engaged the sleeve is locked to the mandrel and will, therefore, rotate with it as the drill string is rotated. Thus the well bore casing can be cleaned and scoured as the well cleaning tool is withdrawn by both rotational and longitudinal movement of the sleeve.

What is claimed is:

1. A well cleaning tool adapted for connection to a drill string for removing debris and residues from the inner wall of a well casing, the tool comprising an elongate generally cylindrical member having a plurality of scratching elements in the outer surface thereof, wherein first and second helical channels or grooves are defined in the said outer surface between the said scratching elements, the second helical channel or groove running in the counter direction to the first helical channel or groove and intersecting the first helical channel or groove at least once.

2. A well cleaning tool according to claim 1, wherein the scratching elements are spring steel bristles.

3. A well cleaning tool according to claim 2, wherein the spring steel bristles are secured in holes in the said outer surface of the cylindrical member and can be replaced as they become worn.

4. A well cleaning tool according to claim 3, comprising a generally cylindrical rigid sleeve which is releasably mounted on a mandrel adapted for connection to a drill string, which cylindrical rigid sleeve defines the said outer surface in which the scratching elements are mounted, including the first and second helical channels or grooves.

5. A well cleaning tool according to claim 2, comprising a generally cylindrical rigid sleeve which is releasably mounted on a mandrel adapted for connection to a drill string, which cylindrical rigid sleeve defines the said outer surface in which the scratching elements are mounted, including the first and second helical channels or grooves.

6. A well cleaning tool according to claim 1, comprising a generally cylindrical rigid sleeve which is releasably mounted on a mandrel adapted for connection to a drill string, which cylindrical rigid sleeve defines the said outer surface in which the scratching elements are mounted, including the first and second helical channels or grooves.

7. A well cleaning tool according to claim 6, wherein the mandrel is threaded on both ends for connection to a drill string and has an annular bore for allowing fluid to be circulated through it.

8. A well cleaning tool according to claim 7, wherein the cylindrical rigid sleeve is comprised of at least one of aluminum alloy, stainless steel, cast iron.

9. A well cleaning tool according to claim 7, wherein the cylindrical rigid sleeve is secured against rotation on and against longitudinal movement along the said mandrel.

10. A well cleaning tool according to claim 7, wherein the cylindrical rigid sleeve is selectively rotatable on the said mandrel with the drill string.

11. A well cleaning tool according to claim 6, wherein the cylindrical rigid sleeve is comprised of at least one of aluminum alloy, stainless steel, cast iron.

12. A well cleaning tool according to claim 11, wherein the cylindrical rigid sleeve is secured against rotation on and against longitudinal movement along the said mandrel.

13. A well cleaning tool according to claim 11, wherein the cylindrical rigid sleeve is selectively rotatable on the said mandrel with the drill string.

14. A well cleaning tool according to claim 6, wherein the cylindrical rigid sleeve is secured against rotation on and against longitudinal movement along the said mandrel.

15. A well cleaning tool according to claim 14, wherein the mandrel is comprised of a pin or spindle which extends through the said cylindrical rigid sleeve and has an externally threaded section at the inner end thereof onto which an internally threaded section in one end of the cylindrical rigid sleeve is screwed, and a locking collar which is attached to the pin or spindle at the outer end thereof to lock against the other end of the cylindrical rigid sleeve.

16. A well cleaning tool according to claim 15, wherein the outer end of the pin or spindle defines an externally threaded section which engages with an internally threaded section in the end of the second part of the mandrel.

17. A well cleaning tool according to claim 6, wherein the cylindrical rigid sleeve is selectively rotatable on the said mandrel with the drill string.

18. A well cleaning tool according to claim 17, wherein a dog clutch is provided between adjacent ends of the cylindrical rigid sleeve and the mandrel which, in use, are located at the forward end of the well cleaning tool, and wherein the sleeve is capable of moving longitudinally on the mandrel to cause the dog teeth of the dog clutch to selectively engage and disengage with each other.

19. A well cleaning tool comprising:
a body comprising an outer surface and a plurality of scratching elements projecting outwardly from said outer surface, said outer surface defining at least first and second helical channels located between said scratching elements, said first and second helical channels defined in counter directions relative to each other so that said first and second helical channels intersect each other at least once at a crossover point.

\* \* \* \* \*